March 2, 1937. L. EMANUELI 2,072,742
STOP JOINT FOR OIL-FILLED CABLES
Filed Nov. 2, 1935
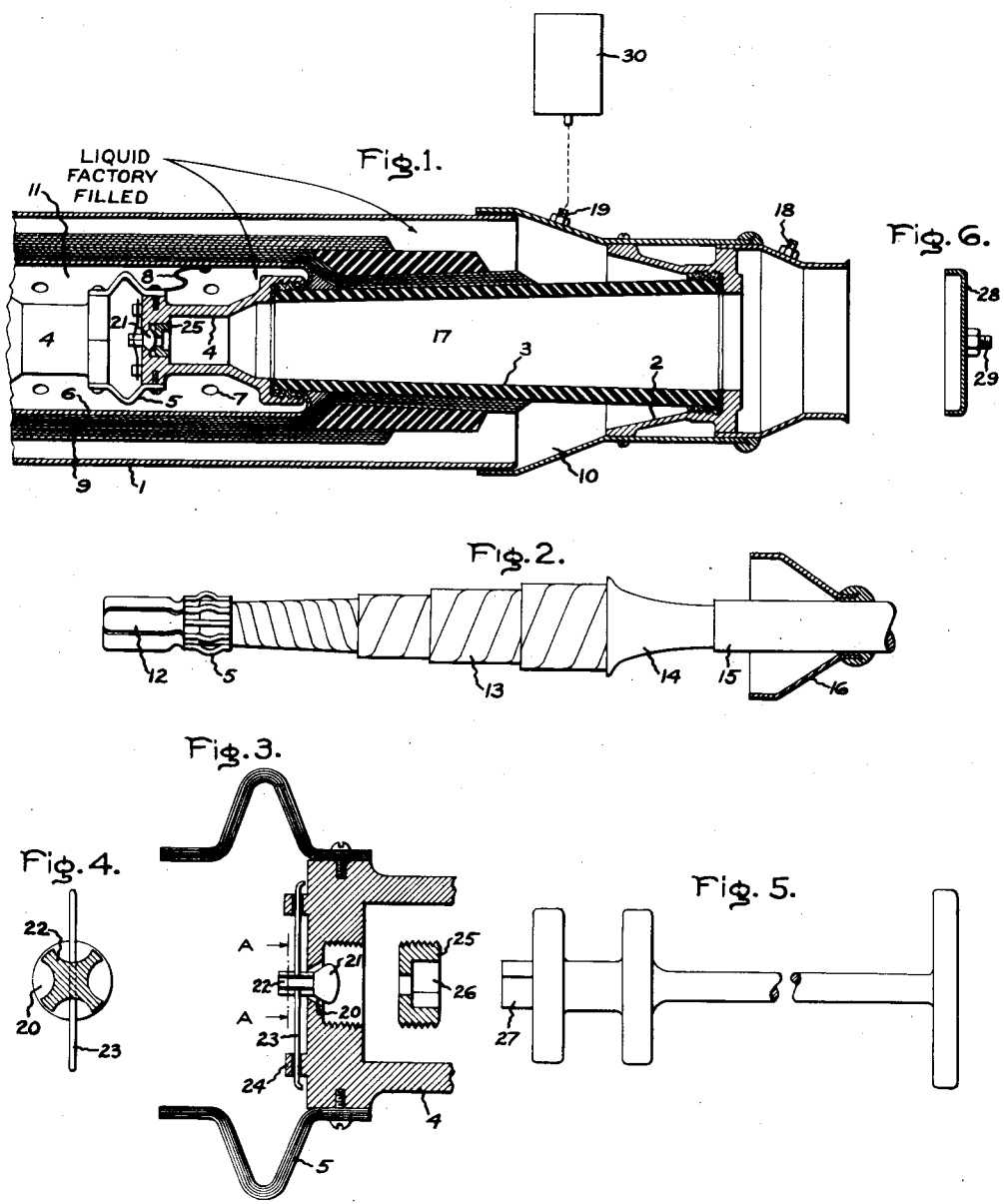
Inventor:
Luigi Emanueli,
by Harry E. Dunham
His Attorney.

Patented Mar. 2, 1937

2,072,742

UNITED STATES PATENT OFFICE 2,072,742

STOP JOINT FOR OIL-FILLED CABLES

Luigi Emanueli, Milan, Italy, assignor to Societá Italiana Pirelli, a corporation of Italy Application November 2, 1935, Serial No. 48,006
In Italy January 30, 1935

5 Claims. (Cl. 173—268)

The present invention is directed to an improvement in stop joints for oil-filled cables of the character disclosed in my Patent No. 1,979,149, issued October 30, 1934, and has for its object an improved arrangement of parts whereby the interior parts of the joint may be more effectively evacuated and filled with degasified oil.

According to my present invention, a means is provided to obtain a more complete impregnation of the fibrous insulating parts, generally made up of insulating paper which is wound under tension around the inside metal parts of the joint. In this way a higher dielectric strength of the insulating parts themselves is obtained, and the joint is therefore capable of resisting higher working tensions.

One form of execution of the present invention, as an example, is described hereunder and is illustrated in the attached drawings, in which:

Fig. 1 is a longitudinal section of one-half of the joint body, that is, of the part of the joint prepared in the factory;

Fig. 2 is a side view of the end of one of the two cables to be joined, ready to be introduced in the joint body;

Fig. 3 shows, on an enlarged scale, in longitudinal section, a particular valve appertaining to the joint body;

Fig. 4 shows on an enlarged scale, a section taken on line A—A of a part of Fig. 3;

Fig. 5 shows the side view of a tool for closing said valve after the joint body has been impregnated, and Fig. 6 is a sectional view of a closure which is temporarily applied to the joint body during impregnation.

All the parts of the stop joint of the present invention, except those shown in Figs. 3 and 5 may be constituted in the same way as the stop joint described in my aforesaid patent.

The joint body, one-half of which is represented in Fig. 1, is formed by the outside casing 1 to which supports 2 for the insulating tubes 3 are fixed, the latter carrying contact sockets or caps 4 which are electrically connected together by flexible couplings 5. A metallic screen 6, provided with holes or perforations 7, is connected to the sockets or caps 4 by a wire 8, said screen defining a central chamber 11 containing liquid insulation. Insulating coverings 9 of fibrous material, generally paper, impregnated with oil or other insulating liquid, cover the screen and part of the insulating tubes, thus forming an obstacle of considerable dielectric strength against the discharge between said screen, which is at the potential of the cable conductor, and the outside casing which is connected to its lead sheath and to ground. The space or chamber 10 inside the joint body defined by the insulation 9 and the casing wall, including the space or chamber 11 inside the screen 6, is completely filled with degasified oil or other insulating liquid in the factory. The other half of the joint body being the same as that illustrated, further illustration and description are unnecessary.

The ends of the two cables to be joined are prepared in a known manner, as shown in Fig. 2, in which can be seen:—the connector 12 with its spring pressed contact members, the insulating wrapping 13 which covers the cable, the electrostatic control 14, the lead sheath 15 of the cable and, soldered to it, one of the end parts 16 of the outside casing of the joint. The end of each of the two cables is introduced into the joint body, so that the connector 12 forms a good contact with the cap 4. After this the casing 1 of the joint is soldered to the end parts 16. The free spaces inside of the insulating tube 3 around the conductor ends is then filled with oil, the opening 18 and connected pipe being used for the purpose.

For filling the joint body and for the contemporaneous impregnation of the insulating covering 9, which operations are carried out in the factory, in the stop joints so far known vacuum was first made through one or two holes existing in the outside casing, such as that indicated with 19, and the oil was forced in afterwards. This procedure, however, did not result in as perfect an impregnation as is desirable for the insulating covering 9, especially the inside layers which are in contact with the screen 6 under tension. One of the difficulties met with was that of removing the air from the space 11 through the holes 7 of the screen and through the great thickness and large area of the covering 9.

This difficulty has been overcome by the present construction, according to which the evacuation and the filling with oil are made, not only through the opening 19 and connected pipe of the outside casing but also through the port 20 at the bottom of one of the caps 4, as shown on an enlarged scale in Fig. 3. The port 20 can be closed by a conical valve 21 provided with a prolongation 22, the section A—A of which is shown in Fig. 4. A flexible steel wire 23, kept in position by the support 24, passes transversely through said prolongation. When the wire is in resting or neutral position, the port 20 is open. To close the port it is necessary to press the valve to its seat by bending the wire, this being done by screwing a piece or plug 25 into the base of the cap 4. This can be held and operated by slipping the squared end 27 of the tool shown in Fig. 5 into the square opening 26. Fig. 1 shows the valve closed which is its normal position.

In order to fill and impregnate the joint body in the factory, the end of the casing on the side of the contact cap having the valve 21 is first of all closed by soldering a cover 28, Fig. 6, to said end, the cover being provided with an opening 29 and connected pipe. From this opening and from the opening 19 the air contained in the casing both inside and outside of the insulation 9 is pumped until the best possible vacuum is obtained, then through these same openings oil flows, that which enters through the opening 29 first fills the space 17 and then flows through the port 20 and fills the central space 11, and subsequently passes therefrom through the holes 7 of the screen and impregnates the insulation 9. At the same time, other oil flowing through the opening 19, cooperates in this impregnation. As a result, the whole joint body is filled with oil. In this way the insulating coverings 9, whose inside layers are in contact with the screen 11 are the first to be reached by the oil, and are thereby perfectly impregnated. By subjecting both sides of the insulation 9 to vacuum at the same time, the removal of gases therefrom is greatly facilitated. By supplying impregnating liquid to both sides of the insulation at the same time, the period of time required for the operation is decreased and better results obtained. The high dielectric strength so given to the insulation renders the joint capable of withstanding very high working tensions.

When the whole of the joint body has been filled with oil, an oil reservoir 30 under pressure is applied to the opening 19 through the connected pipe, then the cover 28 shown in Fig. 6 is unsoldered and removed from the joint casing. Lastly, the screw threaded plug 25 is slipped on the end 27 of the tool shown in Fig. 5 and is screwed to the base of the cap 4, so closing, with the conical valve 21, the port 20. While screwing the plug 25 into place the joint casing should stand vertically so that the column of oil in the chamber 17 prevents entrance of air and escape of oil from the chamber 11.

The joint body is then ready to be dispatched to the place of laying, the small oil reservoir 30 under pressure connected to the opening 19 being left still attached thereto.

What I claim as new and desire to secure by Letters Patent of the United States, is:—

1. A stop joint for cables filled with liquid insulation comprising a casing, a pair of insulating tubes supported thereby and arranged to receive cable ends, sockets supported by the adjacent ends of the tubes for receiving the cable ends and electrically connecting them, a perforated metallic screen supported by the tubes and surrounding the sockets, said screen defining an internal chamber, liquid impregnated insulation covering the screen, and means establishing a direct communication from the chamber through one of the sockets to the outside of the casing for evacuating the chamber and subsequently filling it with liquid to impregnate the insulation.

2. A stop joint for cables filled with liquid insulation comprising a casing, a pair of insulating tubes supported thereby and arranged to receive cable ends, sockets supported by the adjacent ends of the tubes for receiving the cable ends and electrically connecting them, a port and an open valve in one of the sockets, a perforated metallic screen supported at its ends by the tubes and surrounding the sockets, said screen defining a central chamber, a wrapping of liquid impregnated insulation surrounding the screen, means for establishing a direct communication from the chamber through the port to the outside of the casing to permit evacuation of the chamber and subsequent filling of it and impregnation of the insulation with liquid, and a means carried by the socket having the valve for permanently closing it.

3. As an article of manufacture, a body for a stop joint comprising a casing, an insulator having open ends, a contact receiving socket supported by one end of the insulator, a port and valve in the socket, means for holding the valve open, a perforated screen supported at one end by the insulator and defining a central chamber, a wrapping of fibrous insulation around the screen, the wrapping and casing defining an outer chamber between them, a cap for temporarily closing one end of the casing, and conduit means connected to the casing and cap through which the fibrous insulation may be evacuated and subsequently filled with liquid insulation from both sides thereof.

4. The method of treating the body of a stop joint having a casing, a central and an outside chamber within the casing, a body of pervious insulation forming a well between the chambers, sockets for the conductor ends, and a valve controlled port in one of the sockets through which communication may be established between the central chamber and the outside of the casing, which comprises establishing communication between both chambers and the outside of the casing, simultaneously evacuating the chambers and the wall of insulation, then filling the chambers with liquid to impregnate the insulation from both sides thereof, and subsequently closing the communication between the outside chamber and the outside of the casing and sealing the port communicating with the inside chamber.

5. The method of treating the body of a stop joint having a casing, a central and an outside chamber within the casing, a body of fibrous insulation forming a wall between the chambers, and a ported socket for a conductor end, which comprises temporarily capping an end of the casing, establishing one connection through the wall of the casing to the outer chamber and a second connection through the cap and ported socket to the central chamber, evacuating the chambers and the fibrous insulation through said connections, then filling the chambers with liquid and impregnating the insulation, removing the cap, and closing the port in the socket and also the connection to the outside of the casing to confine the liquid within said chambers.

LUIGI EMANUELI.

CERTIFICATE OF CORRECTION.

Patent No. 2,072,742.                                           March 2, 1937.

LUIGI EMANUELI.

It is hereby certified that error appears in the printed specification of the above numbered patent requiring correction as follows: Page 2, second column, line 39, claim 4, for the word "well" read wall; and that the said Letters Patent should be read with this correction therein that the same may conform to the record of the case in the Patent Office.

Signed and sealed this 30th day of March, A. D. 1937.

(Seal)

Henry Van Arsdale
Acting Commissioner of Patents.